(12) United States Patent
Takeo (10) Patent No.: US 10,100,493 B2
(45) Date of Patent: Oct. 16, 2018

(54) SHOVEL

(71) Applicant: SUMITOMO (S.H.I.) CONSTRUCTION MACHINERY CO., LTD., Tokyo (JP)

(72) Inventor: Jitsutaka Takeo, Chiba (JP)

(73) Assignee: SUMITOMO (S.H.I.) CONSTRUCTION MACHINERY CO., LTD., Tokyo (JP)

( * ) Notice: Subject to any disclaimer, the term of this patent is extended or adjusted under 35 U.S.C. 154(b) by 147 days.

(21) Appl. No.: 15/228,923

(22) Filed: Aug. 4, 2016

(65) Prior Publication Data

US 2016/0340865 A1 Nov. 24, 2016

Related U.S. Application Data

(63) Continuation of application No. PCT/JP2015/058839, filed on Mar. 24, 2015.

(30) Foreign Application Priority Data

Mar. 31, 2014 (JP) ................................. 2014-074521

(51) Int. Cl.
*B60K 6/08* (2006.01)
*E02F 9/12* (2006.01)
(Continued)

(52) U.S. Cl.
CPC .............. *E02F 9/123* (2013.01); *B60K 6/485* (2013.01); *B60L 3/0046* (2013.01); *B60L 3/04* (2013.01);
(Continued)

(58) Field of Classification Search
CPC ......... E02F 9/123; E02F 3/325; E02F 9/2075; E02F 9/2095; E02F 9/265; B60K 6/46;
(Continued)

(56) References Cited

U.S. PATENT DOCUMENTS 8,286,740 B2 10/2012 Kagoshima et al.
8,532,855 B2 * 9/2013 Koga ..................... B60L 1/003
180/65.265
(Continued)

FOREIGN PATENT DOCUMENTS

EP 2181905 A2 5/2010
EP 2228492 A1 9/2010
(Continued)

OTHER PUBLICATIONS

PCT International Search Report and Written Opinion, PCT Application No. PCT/JP2015/058839, dated Jun. 16, 2015, 10 pages (with English translation of search report).
(Continued)

*Primary Examiner* — Hau V Phan
(74) *Attorney, Agent, or Firm* — Fenwick & West LLP (57) ABSTRACT

A shovel according to an embodiment of the present invention includes an engine; a motor generator that functions as a motor that uses a drive force of the engine and functions as a motor capable of assisting the engine; a power storage system, a swiveling motor; a DC bus that connects the motor generator, the power storage system, and the swiveling motor; and a controller that controls movements of the motor generator, the power storage system, and the swiveling motor. In a case where the power storage system is stopped, the controller supplies electric power of the motor generator that functions as the power generator to the swiveling motor when the swiveling motor is in a power running operation, and supplies regenerative electric power of the swiveling motor to the motor generator that functions as the motor when the swiveling motor is in a regenerative operation.

8 Claims, 6 Drawing Sheets

(51) Int. Cl.
  *E02F 9/20* (2006.01)
  *E02F 9/22* (2006.01)
  *E02F 9/26* (2006.01)
  *B60K 6/485* (2007.10)
  *B60L 11/00* (2006.01)
  *B60L 3/00* (2006.01)
  *B60L 3/04* (2006.01)
  *E02F 3/32* (2006.01)

(52) U.S. Cl.
  CPC .......... *B60L 11/005* (2013.01); *E02F 9/2033* (2013.01); *E02F 9/2075* (2013.01); *E02F 9/2095* (2013.01); *E02F 9/2285* (2013.01); *E02F 9/2296* (2013.01); *E02F 9/265* (2013.01); *E02F 9/268* (2013.01); *B60L 2200/40* (2013.01); *B60L 2240/36* (2013.01); *E02F 3/32* (2013.01); *Y02T 10/7022* (2013.01); *Y10S 903/903* (2013.01)

(58) Field of Classification Search
  CPC . B60K 6/22; B60K 6/48; B60K 6/365; B60K 6/485; B60K 6/08
  See application file for complete search history.

(56) References Cited

U.S. PATENT DOCUMENTS

| | | | |
|---|---|---|---|
| 9,103,094 B2 | 8/2015 | Magaki et al. | |
| 2005/0246082 A1* | 11/2005 | Miki | E02F 9/2075 701/50 |
| 2007/0096667 A1* | 5/2007 | Komiyama | B60Q 1/506 318/98 |
| 2007/0214782 A1* | 9/2007 | Komiyama | B60K 6/46 60/431 |
| 2009/0036264 A1* | 2/2009 | Tozawa | B60K 6/22 477/5 |
| 2010/0031650 A1* | 2/2010 | Morinaga | B60L 1/003 60/459 |
| 2010/0097037 A1* | 4/2010 | Morinaga | B60K 6/46 322/14 |
| 2010/0102763 A1* | 4/2010 | Kagoshima | B60K 6/46 318/380 |
| 2010/0115800 A1* | 5/2010 | Sakai | F04B 49/06 37/348 |
| 2010/0162706 A1* | 7/2010 | Sakai | E02F 3/325 60/706 |
| 2011/0093150 A1* | 4/2011 | Yanagisawa | B60K 6/365 701/22 |
| 2011/0251746 A1* | 10/2011 | Wu | B60K 6/48 701/22 |
| 2012/0234613 A1* | 9/2012 | Miyatake | E02F 9/0858 180/65.1 |
| 2012/0240582 A1* | 9/2012 | Ooki | E02F 9/123 60/711 |
| 2013/0157089 A1* | 6/2013 | Miyatake | H05K 7/20509 429/72 |
| 2013/0174556 A1* | 7/2013 | Nishikawa | E02F 9/123 60/718 |
| 2013/0243557 A1* | 9/2013 | Hiroki | B60L 11/123 414/687 |
| 2013/0275011 A1* | 10/2013 | Ota | E02F 9/2075 701/50 |
| 2013/0311052 A1 | 11/2013 | Edamura et al. | |
| 2014/0074337 A1 | 3/2014 | Magaki et al. | |

FOREIGN PATENT DOCUMENTS

| | | |
|---|---|---|
| JP | 2005-307587 A | 11/2005 |
| JP | 2010-106513 A | 5/2010 |
| JP | 2010-173599 A | 8/2010 |
| JP | 2010-242444 A | 10/2010 |

OTHER PUBLICATIONS

European Extended Search Report, European Application No. 15773193.6, dated Nov. 6, 2017, 7 pages.

\* cited by examiner

SHOVEL

CROSS REFERENCE TO RELATED APPLICATIONS

This application is a continuation of PCT Application No. PCT/JP2015/058839 filed on Mar. 24, 2015 which claims priority to Japanese Patent Application No. 2014-074521 filed on Mar. 31, 2014, which are incorporated by reference herein in their entirety.

BACKGROUND

Technical Field

Certain embodiments of the present invention relate to a shovel that includes a swiveling motor driven by electric power accumulated in a power storage device.

Description of Related Art

In the related art, a shovel that maintains driving of an electric swivel system by increasing an output of an engine by reducing an output of a power storage system in a case where an abnormality of the power storage system is detected is known.

SUMMARY

According to an embodiment of the present invention, there is provided a shovel including: an engine; a motor generator that functions as a power generator that uses a drive force of the engine and functions as a motor capable of assisting the engine; a power storage system; a swiveling motor; a bus line that connects the motor generator, the power storage system, and the swiveling motor; and a control device that controls movements of the motor generator, the power storage system, and the swiveling motor, in which in a case where the power storage system is stopped, the control device supplies electric power of the motor generator that functions as the power generator to the swiveling motor when the swiveling motor is in a power running operation, and supplies regenerative electric power of the swiveling motor to the motor generator that functions as the motor when the swiveling motor is in a regenerative operation.

According to the above-described configuration, there is provided a shovel capable of appropriately driving an electric swivel system even in a case where a power storage system is stopped.

DETAILED DESCRIPTION

However, the related art technique does not mention a case where it is necessary to stop the power storage system due to severe breakdown of the power storage system. In such a shovel, in a case where the power storage system is stopped, although it is possible to drive an electric swivel system using the engine, since the power storage system cannot absorb regenerative electric power from the electric swivel system, it is not possible to electrically control the electric swivel system. Thus, in the shovel, it is necessary to maintain the electric swivel system in a mechanically stopped state. However, in a case where the shovel is in an unstable posture at a slope, if the electric swivel system is mechanically stopped, it may not be preferable in view of safety.

It is desirable to provide a shovel capable of securing safety even in a case where a power storage system is stopped.

Figure 1:
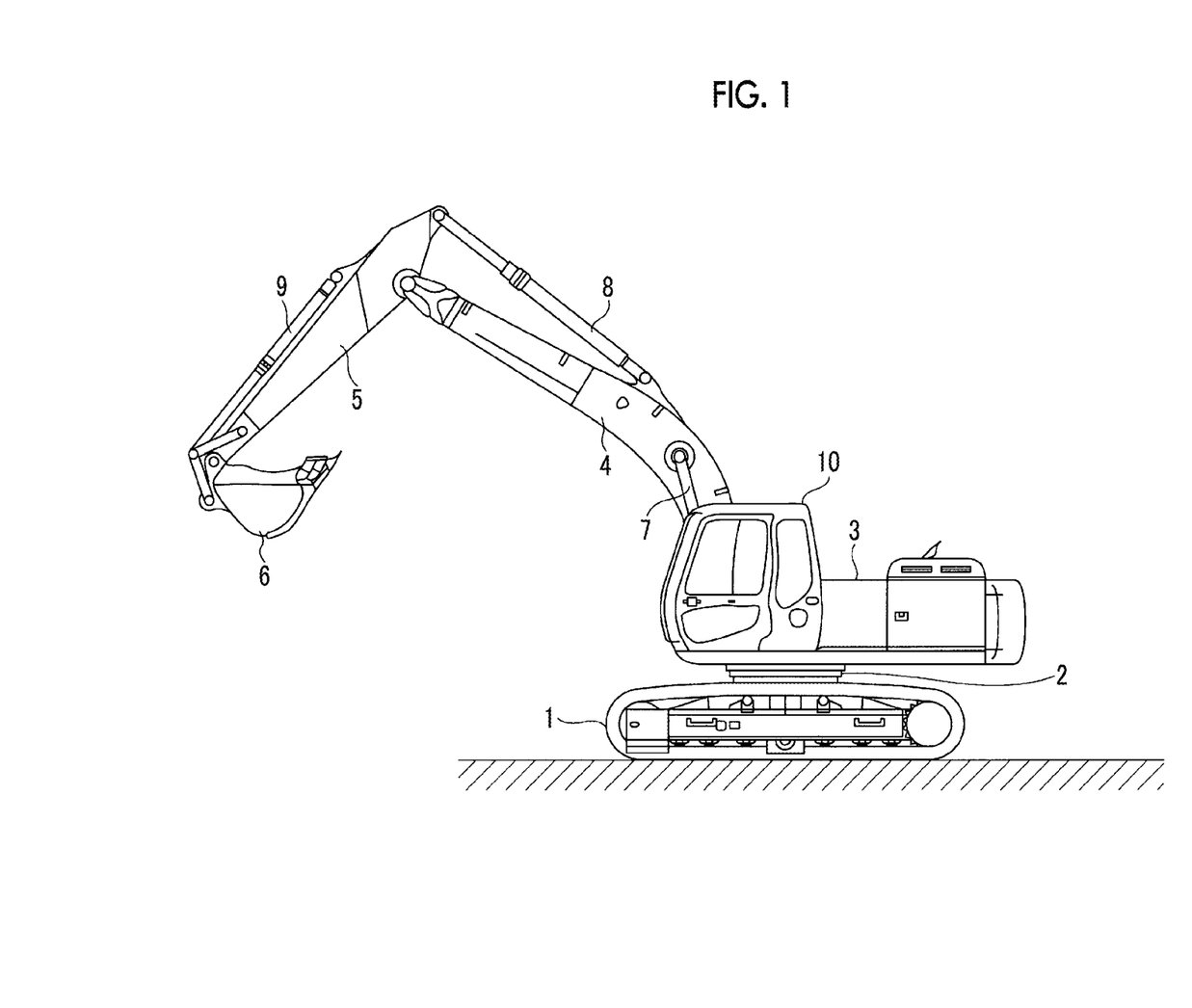
FIG. 1 is a side view of a hybrid shovel.

FIG. 1 is a side view illustrating a hybrid shovel to which the invention is applied.

On a lower traveling body 1 of the hybrid shovel, an upper swivel body 3 is mounted through a rotation mechanism 2. A boom 4 is attached to the upper swivel body 3. An arm 5 is attached to a tip of the boom 4, and a bucket 6 which is an end attachment is attached to a tip of the arm 5. The boom 4, the arm 5, and the bucket 6 form an excavating attachment which is an example of an attachment, and are hydraulically driven by a boom cylinder 7, an arm cylinder 8, and a bucket cylinder 9, respectively. A cabin 10 is provided on the upper swivel body 3, and a power source such as an engine is mounted therein.

Figure 2:
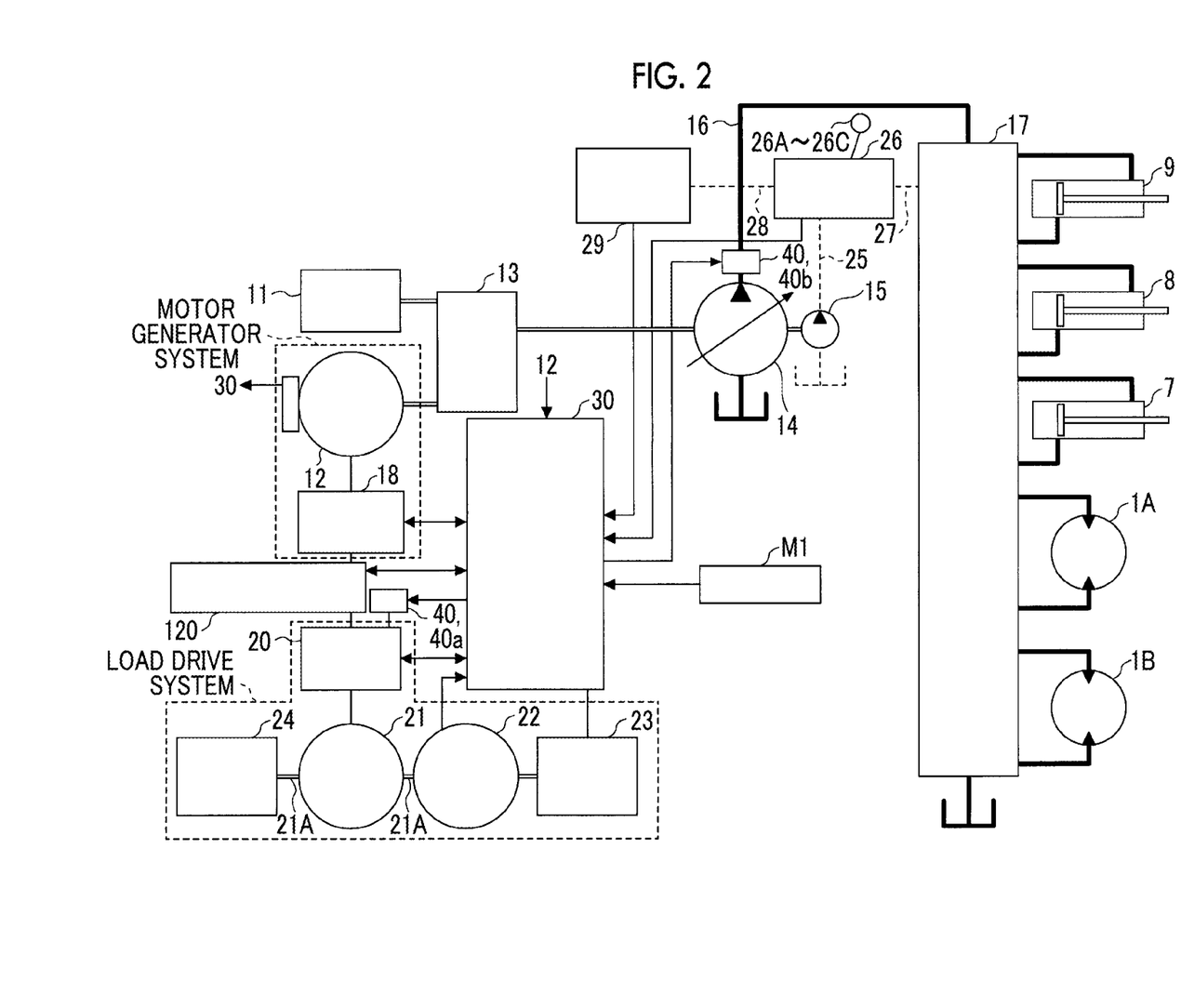
FIG. 2 is a block diagram illustrating a configuration of a drive system of the hybrid shovel shown in FIG. 1.

FIG. 2 is a block diagram illustrating a configuration example of a drive system of a hybrid shovel according to an embodiment of the invention. In FIG. 2, a mechanical power system is indicated by a double line, a high pressure hydraulic line is indicated by a thick solid line, a pilot line is indicated by a broken line, and an electric drive control system is indicated by a fine solid line, respectively.

An engine 11 which is a mechanical drive unit and a motor generator 12 which is an assist drive unit are connected to two input shafts of a speed change gear 13. A main pump 14 which is a variable displacement hydraulic pump and a pilot pump 15 which is a fixed capacity type hydraulic pump are respectively connected to an output shaft of the speed change gear 13. A control valve 17 is connected to the main pump 14 through a high pressure hydraulic line 16.

The control valve 17 is a control device that controls a hydraulic system in the hybrid shovel. Hydraulic actuators such as hydraulic motors 1A (right side) and 1B (left side) for the lower traveling body 1, the boom cylinder 7, the arm cylinder 8, and the bucket cylinder 9 are connected to the control valve 17 through the high pressure hydraulic line. The hydraulic system includes the hydraulic motors 1A (right side) and 1B (left side) for the lower traveling body 1, the boom cylinder 7, the arm cylinder 8, the bucket cylinder 9, the main pump 14, and the control valve 17.

A power storage system 120 that includes a capacitor which is a power storage device is connected to the motor generator 12 through the inverter 18 which is a motor generator control unit. Further, a swiveling motor 21 which is an electric operation element is connected to the power storage system 120 through the inverter 20 which is a motor generator control unit. A resolver 22, a mechanical brake 23, and a swiveling speed change gear 24 are connected to a rotating shaft 21A of the swiveling motor 21. Further, an operation device 26 is connected to the pilot pump 15 through a pilot line 25. The swiveling motor 21, the inverter 20, the resolver 22, the mechanical brake 23, and the swiveling speed change gear 24 form an electric swivel system which is a load drive system.

The operation device 26 includes a lever 26A, a lever 26B, and a pedal 26C. The lever 26A, the lever 26B, and the pedal 26C are respectively connected to the control valve 17 and a pressure sensor 29 through hydraulic lines 27 and 28. The pressure sensor 29 is connected to a controller 30 that performs a drive control of an electric system.

An inclination sensor M1 is an example of a slope detection unit that detects that the hybrid shovel is positioned at a slope. In this embodiment, the inclination sensor M1 is an acceleration sensor mounted on the upper swivel body 3, and detects an inclination angle of the upper swivel body 3 and outputs a detection value to the controller 30.

A heat consumption unit 40 is a functional element for consuming a regenerative electric power generated by the swiveling motor 21 as heat. In this embodiment, the heat consumption unit 40 includes an electric resistance unit 40a and a flow rate control valve 40b. At least one of the electric resistance unit 40a and the flow rate control valve 40b may not be provided.

The electric resistance unit 40a includes a switching switch and an electric resistance. The switching switch is a switch that switches conduction and cut off between the inverter 20 and the electric resistance according to a control signal from the controller 30. Further, the electric resistance unit 40a allows the conduction between the inverter 20 and the electric resistance according to a control signal from the controller 30, and receives the regenerative electric power generated by the swiveling motor 21 as a direct current power when swiveling is stopped. The electric resistance receives the regenerative electric power to generate heat. In this way, the electric resistance unit 40a can consume the regenerative electric power as heat, to thereby make it possible to reliably consume the regenerative electric power generated by the swiveling motor 21.

The flow rate control valve 40b is a valve capable of controlling a flow rate of working oil discharged by the main pump 14. The flow rate control valve 40b limits the flow rate of the working oil discharged by the main pump 14 according to a control signal from the controller 30 to increase a discharge pressure and an absorbing horsepower of the main pump 14. The flow rate control valve 40b limits the flow rate of the working oil discharged by the main pump 14 to cause a pressure loss and to generate heat. Further, an increase of the absorbing horsepower of the main pump 14 causes an increase of a hydraulic pressure load of the engine 11, and causes an increase of an assist torque of the motor generator 12 capable of being received by the engine 11. Further, the increase of the assist torque capable of being received by the engine 11 causes an increase of regenerative electric power capable of being consumed by the motor generator 12, and an increase of regenerative electric power capable of being generated by the swiveling motor 21. In this way, the flow rate control valve 40b can intermittently consume the regenerative electric power as heat, to thereby make it possible to reliably consume the regenerative electric power generated by the swiveling motor 21. On the other hand, a target speed of the engine 11 may be maintained in a low state. By maintaining kinetic energy of the engine 11 in a low state, receivable regenerative electric power increases.

Figure 3:
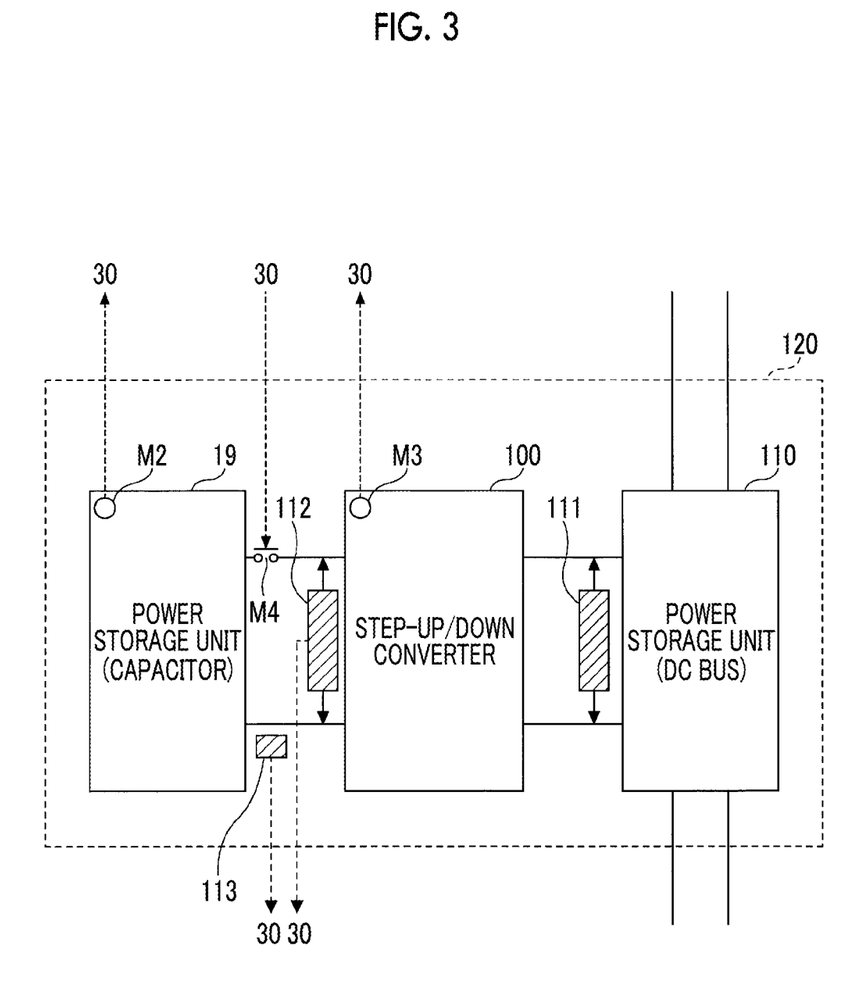
FIG. 3 is a block diagram illustrating a configuration of a power storage system.

FIG. 3 is a block diagram illustrating a configuration of the power storage system 120. The power storage system 120 includes a capacitor 19 which is a first power storage device, a step-up/down converter 100, and a DC bus 110 which is a bus line. The DC bus 110 which is a second power storage device controls transmission and reception of electric power between the capacitor 19 which is the first power storage device, the motor generator 12, and the swiveling motor 21. A capacitor voltage detection unit 112 for detecting a capacitor voltage value and a capacitor current detection unit 113 for detecting a capacitor current value are provided in the capacitor 19. The capacitor voltage value and the capacitor current value detected by the capacitor voltage detection unit 112 and the capacitor current detection unit 113 are supplied to the controller 30.

Further, a temperature sensor M2 which is a temperature detection unit for detecting a temperature of the capacitor 19 is provided in the capacitor 19. Further, a temperature sensor M3 which is a temperature detection unit for detecting a temperature of the step-up/down converter 100 is provided in the step-up/down converter 100. The temperature sensors M2 and M3 are configured by thermistors, for example, and output respective detection values to the controller 30. The temperature of the capacitor 19 may be intermittently detected by detecting a temperature of cooling water used for cooling of the capacitor 19.

The step-up/down converter 100 performs a control for switching a step-up operation and a step-down operation so that a DC bus voltage value is within a predetermined range according to operation states of the motor generator 12 and the swiveling motor 21. The DC bus 110 is provided between the inverters 18 and 20 and the step-up/down converter 100, and receives and transmits electric power between the capacitor 19, the motor generator 12, and the swiveling motor 21.

A switching switch M4 is provided between the capacitor 19 and the step-up/down converter 100. The switching switch M4 is a switch for switching conduction and cut off between the capacitor 19 and the step-up/down converter 100 according to a control signal from the controller 30.

The controller 30 is a control device which is a main control unit that performs a drive control of the hybrid shovel. In this embodiment, the controller 30 is configured by an arithmetic processing unit including a CPU and an internal memory, and various functions thereof are realized by causing a program for a drive control stored in the internal memory to be executed by the CPU.

Further, the controller 30 converts a signal supplied from the pressure sensor 29 into a speed command, and performs a drive control of the swiveling motor 21. The signal supplied from the pressure sensor 29 corresponds to a signal indicating a manipulated variable in a case where the operation device 26 is operated to swivel the rotation mechanism 2.

Further, the controller 30 performs an operation control (switching of an electric (assist) operation or a power generating operation) of the motor generator 12, and performs a charge/discharge control of the capacitor 19 based on a drive control of the step-up/down converter 100 which is a step-up/down control unit. Furthermore, the controller 30 performs a switching control of the step-up operation and the step-down operation of the step-up/down converter 100 based on a charging state of the capacitor 19, an operating state (assist operation or power generating operation) of the motor generator 12, and an operating state (power running operation or regenerative operation) of the swiveling motor 21, and performs the charge/discharge control of the capacitor 19.

The switching control of the step-up operation and the step-down operation of the step-up/down converter 100 is performed based on a DC bus voltage detected by the DC bus voltage detection unit 111, a capacitor voltage value detected by the capacitor voltage detection unit 112, and a capacitor current value detected by the capacitor current detection unit 113.

Electric power generated by the motor generator 12 which is an assist motor is supplied to the DC bus 110 of the power storage system 120 through the inverter 18, and then, is supplied to the capacitor 19 through the step-up/down converter 100, or is supplied to the swiveling motor 21 through the inverter 20. Further, regenerative electric power which is generated by the regenerative operation of the swiveling motor 21 is supplied to the DC bus 110 of the power storage system 120 through the inverter 20, and then, is supplied to the capacitor 19 through the step-up/down converter 100, or is supplied to the motor generator 12 through the inverter 18. In addition, electric power stored in the capacitor 19 is supplied to at least one of the motor generator 12 and the swiveling motor 21 through the step-up/down converter 100 and the DC bus 110.

Figure 4:
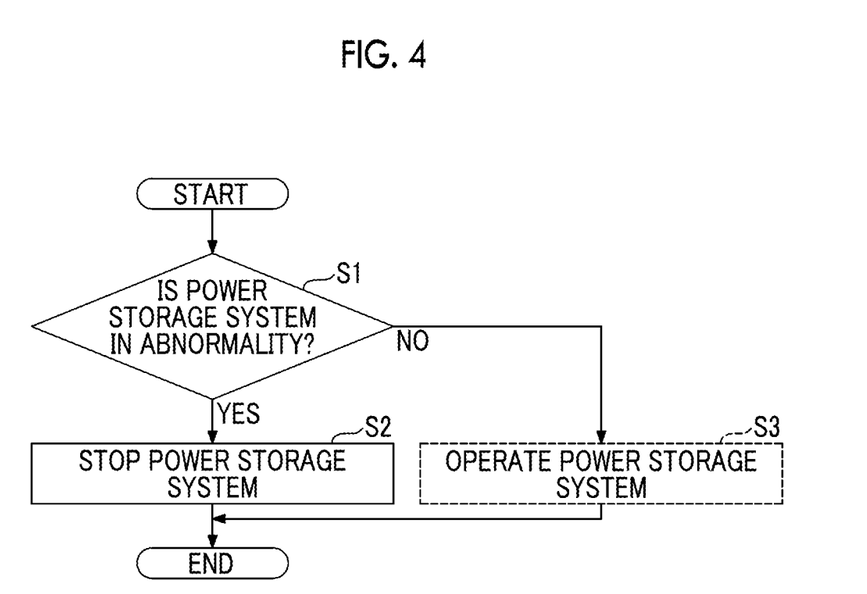
FIG. 4 is a flowchart illustrating a flow of a power storage system stopping process.

Next, a process of stepping the power storage system 120 by the controller 30 in a case where there is an abnormality in the power storage system 120 (hereinafter, referred to as a "power storage system stopping process") will be described with reference to FIG. 4. FIG. 4 is a flowchart illustrating a flow of the power storage system stopping process. The controller 30 repeatedly executes the power storage system stopping process at a predetermined cycle. Further, the "abnormality" of the power storage system 120 may include all situations where an event to stop input or output of electric power in the capacitor 19 occurs.

First, the controller 30 determines whether the power storage system 120 is in abnormality (step S1). In this embodiment, the controller 30 determines whether the power storage system 120 is in abnormality based on outputs of the DC bus voltage detection unit 111, the capacitor voltage detection unit 112, the capacitor current detection unit 113, the temperature sensor M2, the temperature sensor M3, and the like. Specifically, in a case where the temperature of the capacitor 19 is equal to or higher than a predetermined temperature, or in a case where the temperature of the step-up/down converter 100 is equal to or higher than a predetermined temperature, the controller 30 determines that the power storage system 120 is in abnormality. Further, in a case where the capacitor voltage value deviates from a predetermined range, in a case where the capacitor current value deviates from a predetermined range, or in a case where the DC bus voltage value deviates from a predetermined range, the controller 30 determine that the power storage system 120 is in abnormality. In addition, in a case where breakdown of a battery management unit that controls and manages a state of a capacitor cell in the capacitor 19 is detected, or in a case where the battery management unit detects abnormality of the capacitor cell (over-charging and over-discharging of the capacitor cell, deterioration of the capacitor cell based on a capacity measurement result of the capacitor cell, or the like), the controller 30 may determine that the power storage system 120 is in abnormality. Further, in a case where an abnormality of the DC bus voltage detection unit 111, the capacitor voltage detection unit 112, the capacitor current detection unit 113, the temperature sensor M2, the temperature sensor M3, or the like is detected, the controller 30 may determine that the power storage system 120 is in abnormality. In addition, in a case where deterioration of the capacitor 19 is detected based on a measurement result of internal resistance of the capacitor 19, the controller 30 may determine that the power storage system 120 is in abnormality.

In a case where the power storage system 120 is in abnormality (YES in step S1), the controller 30 stops the power storage system 120 (step S2). In this embodiment, the controller 30 outputs a control signal (disconnection signal) to the switching switch M4 to disconnect the capacitor 19 and the step-up/down converter 100. Further, the controller 30 sets a value of a power storage system state flag in the internal memory to "1" (stopped state). The power storage system state flag is a flag that stores a state of the power storage system 120, and has "0" as an initial value (operation state). Furthermore, the controller 30 stops the operation of the step-up/down converter 100. The controller 30 may stop the power storage system 120 only by stopping the operation of the step-up/down converter 100.

On the other hand, in a case where it is determined that the power storage system 120 is not in abnormality (NO in step S1), the controller 30 terminates a current power storage system stopping process without stopping the power storage system 120. Further, even in a case where the power storage system 120 is already stopped, the controller 30 terminates the current power storage system stopping process without restarting the operation of the power storage system 120.

Here, in a case where it is determined that the power storage system 120 is not in abnormality after the power storage system 120 is stopped, the controller 30 may restart the operation of the power storage system 120 (step S3). Step S3 indicated by a broken line represents that the process of restarting the operation of the power storage system 120 is a process that may not be performed. Specifically, the controller 30 outputs a control signal (conduction signal) to the switching switch M4 to allow conduction between the capacitor 19 and the step-up/down converter 100. Further, the controller 30 sets a value of the power storage system state flag in the internal memory to "0" (operation state). Furthermore, the controller 30 restarts the operation of the step-up/down converter 100. In a case where the power storage system 120 is stopped only by stopping the operation of the step-up/down converter 100, the controller 30 restarts the operation of the power storage system 120 by restarting the operation of the step-up/down converter 100.

In this way, in a case where it is determined that the power storage system 120 is in abnormality, the controller 30 stops the power storage system 120.

Figure 5:
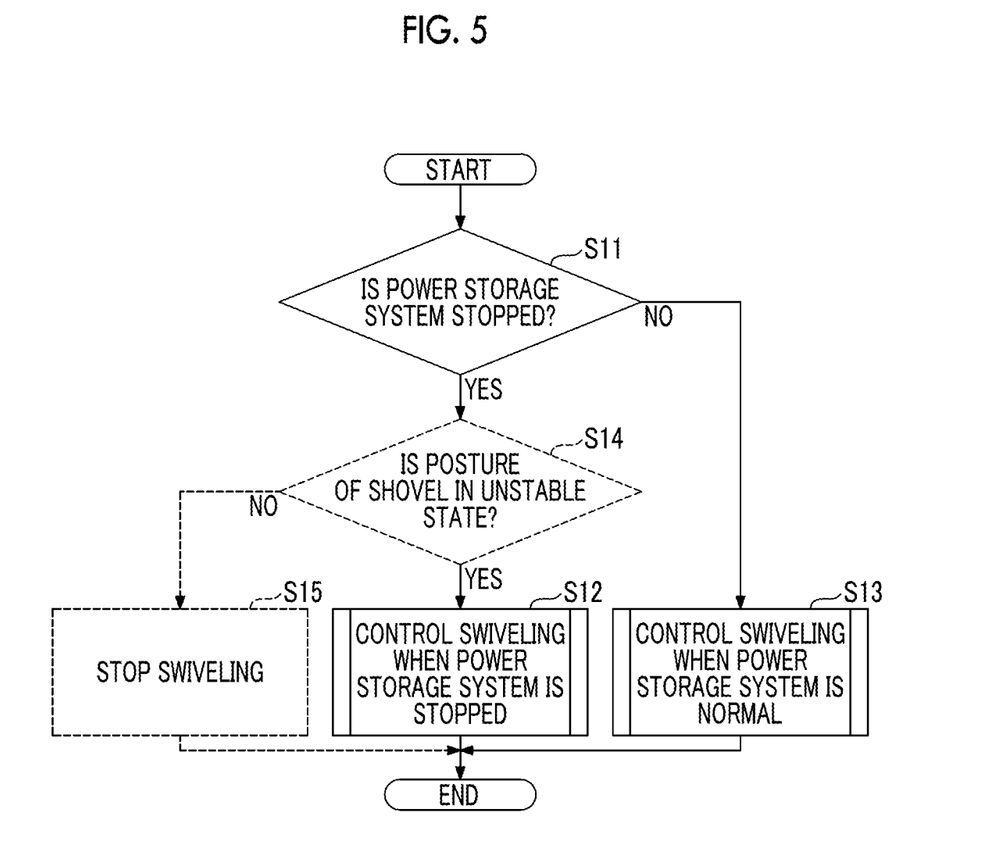
FIG. 5 is a flowchart illustrating a flow of a swivel control switching process.

Next, a process of switching swiveling control details by the controller 30 according to the state of the power storage system 120 in a case where a swiveling operation is performed (hereinafter, referred to as a "swiveling control switching process") will be described with reference to FIG. 5. FIG. 5 is a flowchart illustrating a flow of the swiveling control switching process. The controller 30 executes the swiveling control switching process in a case where a swiveling operation is performed.

First, the controller 30 determines whether the power storage system 120 is in a stopped state (step S11). In this embodiment, the controller 30 determines whether the power storage system 120 is in the stopped state with reference to a power storage system state flag in the internal memory.

In a case where it is determined that the power storage system 120 is in the stopped state (YES in step S11), the controller 30 employs a power storage system stop swiveling control as swiveling control details (step S12). In this embodiment, in a case where a value of the power storage system state flag is "1" (stopped state), the controller 30 employs the power storage system stop swiveling control. Details about the power storage system stop swiveling control will be described later.

On the other hand, in a case where it is determined that the power storage system 120 is not in the stopped state (NO in step S11), the controller 30 employs a normal swiveling control as swiveling control details (step S13). In this embodiment, in a case where a value of the power storage system state flag is "0" (operation state), the controller 30 employs the normal swiveling control. In the normal swiveling control, the controller 30 charges or discharges the capacitor 19 so that the capacitor 19 can maintain a predetermined state of charge (SOC). Specifically, the controller 30 maintains the SOC of the capacitor 19 at an appropriate level (for example, 70%) so that overcharging does not occur even in a case the capacitor 19 receives regenerative electric power from various electric loads such as the swiveling motor 21, or even in a case where the capacitor 19 receives electric power generated by power generation of the motor generator 12 for a purpose of other than charging of the capacitor 19.

In this embodiment, the SOC of the capacitor 19 is calculated based on a capacitor voltage value detected by the capacitor voltage detection unit 112. Here, the SOC of the capacitor 19 may be derived by measuring an internal resistance of the capacitor 19, or may be derived using another known arbitrary method.

Further, in a case where it is determined that the power storage system 120 is in the stopped state (YES in step S11), the controller 30 determines whether the posture of the shovel is in an unstable state (step S14), and may determine whether to employ the power storage system stop swiveling control.

For example, in a case where it is detected that the shovel is disposed at a slope based on an output of the inclination sensor M1, the controller 30 determines that the posture of the shovel is in the unstable state. Alternatively, in a case where a swivel speed calculated based on an output of the resolver 22 is equal to or higher than a predetermined value, the controller 30 may determine that the posture of the shovel is in the unstable state. Further, in a case where a working radius (a distance between the center of swiveling and the bucket 6) of the shovel calculated from a boom angle, an arm angle, and a bucket angle is equal to or longer than a predetermined value, the controller 30 may determine that the posture of the shovel is in the unstable state. In addition, in a case where the weight of earth and sand or the like in the bucket 6 calculated from a boom cylinder pressure is equal to or larger than a predetermined value, the controller 30 may determine that the posture of the shovel is in the unstable state. The boom angle, the arm angle, the bucket angle, the boom cylinder pressure, and the like are detected by known sensors.

In a case where it is determined that the posture of the shovel is in the unstable state (YES in step S14), the controller 30 employs the power storage system stop swiveling control (step S12).

On the other hand, in a case where it is determined that the posture of the shovel is not in the unstable state (NO in step S14), the controller 30 stops swiveling of the upper swivel body 3 (step S15). Specifically, during swiveling, even in a case where the swiveling operation is performed, the controller 30 operates the mechanical brake 23 to stop the swiveling of the upper swivel body 3. Alternatively, during non-swiveling, even in a case where the swiveling operation is performed, the controller 30 does not operate the motor generator 12 and the swiveling motor 21, and thus, does not start the swiveling of the upper swivel body 3. Further, the controller 30 may stop the engine 11 to completely stop the shovel.

Step S14 and step S15 indicated by a broken line represent that the process of determining whether the posture of the shovel is in the unstable state and the process of stopping the swiveling are processes that may not be performed.

In this way, the controller 30 switches the swiveling control details according to the state of the power storage system 120.

Next, details about the power storage system stop swiveling control will be described. In the power storage system stop swiveling control, when the swiveling motor 21 is in a power running operation state, the controller 30 causes the motor generator 12 to function as a power generator using a drive force of the engine 11. The controller 30 drives the swiveling motor 21 only using the electric power generated by the motor generator 12.

The controller 30 may limit a speed command, a swivel torque or the like (hereinafter, referred to as "swivel torque or the like") so that the swivel speed does not exceed a predetermined value. Thus, it is possible to prevent a maximum value of regenerative electric power generated by the swiveling motor 21 in subsequent swiveling regeneration from exceeding a consumable power of the motor generator 12. The consumable power is electric power capable of being received by the motor generator 12 that functions as a motor that assists the engine 11, and becomes larger as a load of the engine 11 becomes larger. For example, in a case where a hydraulic actuator is operated, since a hydraulic pressure load of the engine 11 is large, the consumable power becomes large.

If the swivel torque or the like is limited, a maximum swivel speed of the upper swivel body 3 is lowered. Here, in a case where an operation of the hydraulic pressure actuator is performed, the controller 30 may lower an operation speed of the hydraulic actuator according to the decrease of the maximum swivel speed. Thus, it is possible to satisfy an operational feeling desired by an operator. Specifically, the controller 30 controls a regulator (not shown) that adjusts a swash plate inclination angle of the main pump 14 according to reduction of the maximum swivel speed to reduce the amount of discharge of the main pump 14.

Figure 6:
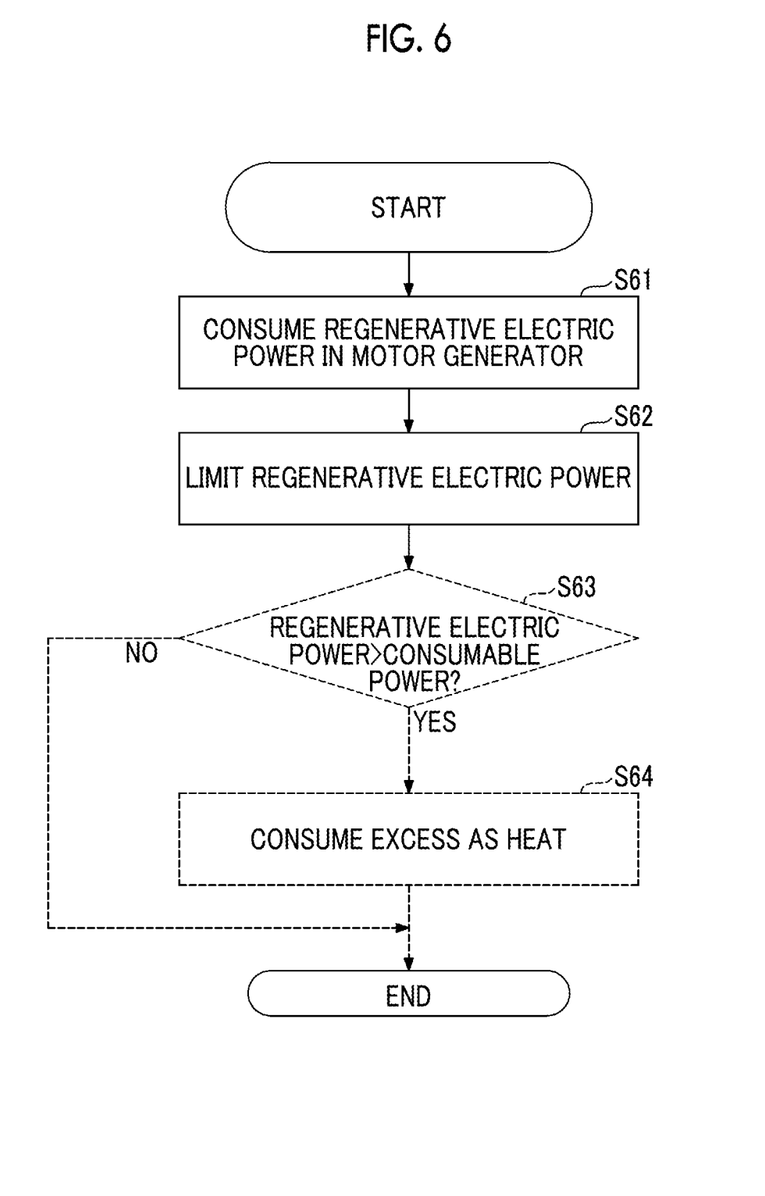
FIG. 6 is a flowchart illustrating a flow of a swivel regeneration process in a swivel control when a power storage system is stopped.

Next, in the power storage system stop swiveling control, a process of controlling regenerative electric power generated by the swiveling motor 21 by the controller 30 in a case where the swiveling motor 21 is in a regenerative operation state will be described with reference to FIG. 6. FIG. 6 is a flowchart illustrating a flow of the process, in which the controller 30 repeatedly executes the process at a predetermined cycle in a case where the swiveling motor 21 is in the regenerative operation state.

Schematically, in a case where the power storage system 120 is stopped, the controller 30 limits a braking torque according to the posture of the shovel when the swiveling motor 21 is operated for regeneration. Thus, it is possible to prevent the shovel which is in an unstable state from losing its balance due to reaction based on the inertia of the upper swivel body 3 generated when the upper swivel body 3 stops swiveling. The braking torque is basically a braking torque generated when the swiveling motor 21 is operated for regeneration, but may include a braking torque based on the mechanical brake 23.

First, the controller 30 causes the motor generator 12 to consume regenerative electric power generated by the swiveling motor 21 (step S61). For example, the controller 30 forcibly causes the motor generator 12 to function as a motor regardless of whether the engine 11 requires an assist output.

Further, in a case where the posture of the shovel is in the unstable state, the controller 30 limits regenerative electric power (step S62). For example, the controller 30 reduces an excitation current of the swiveling motor 21 to reduce regenerative electric power generated by the swiveling motor 21. In this case, the controller 30 reduces an assist output of the motor generator 12 according to the reduction of the regenerative electric power. Thus, it is possible to limit a braking torque generated by the swiveling motor 21 to be smaller than a predetermined braking torque, and to prevent reaction due to the inertia of the upper swivel body 3 generated when the upper swivel body 3 stops swiveling from excessively increasing. Further, in a case where the mechanical brake 23 is used together, the controller 30 may limit a braking torque generated by the mechanical brake 23 by intermittently operating the mechanical brake 23.

In a case where the regenerative electric power of the swiveling motor 21 is larger than the consumable power of the motor generator 12, the controller 30 may consume an excess thereof as heat. Specifically, the controller 30 determines whether the regenerative electric power is larger than the consumable power based on an output of a current detection unit (not shown) that detects an electric current flowing in the inverter 20 (step S63). Further, in a case where it is determined that the regenerative electric power is larger than the consumable power (YES in step S63), the controller 30 operates the heat consumption unit 40 to consume the excess as heat (step S64). Thus, it is possible to reliably consume the entirety of the regenerative electric power generated by the swiveling motor 21 to generate a desired braking force.

Step S63 and step S64 indicated by a broken line represent that the process of determining whether the regenerative electric power is larger than the consumable power and the process of consuming the excess as heat are processes that may not be performed. Thus, by limiting a swivel torque or the like during power swiveling to limit the swivel operation, it is possible to prevent the regenerative electric power from exceeding the consumable power during regenerative swiveling.

Through the above-described configuration, in a case where the power storage system 120 is stopped, when the swiveling motor 21 is in the power running operation, the controller 30 supplies electric power generated by the motor generator 12 that functions as a power generator to the swiveling motor 21. Further, in a case where the power storage system 120 is stopped, when the swiveling motor 21 is in a regenerative operation, the controller 30 supplies regenerative electric power of the swiveling motor 21 that functions as a motor to the motor generator 12. Thus, even when the power storage system 120 is stopped, it is possible to appropriately drive the electric swivel system. As a result, even when an abnormality of the power storage system 120 occurs in the shovel that is in an unstable posture and the electric swivel system is stopped, by allowing subsequent driving of the electric swivel system, it is possible to change the shovel's state to a stable posture.

Further, the shovel according to this embodiment of the invention may include the heat consumption unit 40 that consumes the regenerative electric power of the swiveling motor 21 as heat. In this case, even in a case where the regenerative electric power is larger than the consumable power of the motor generator 12, it is possible to reliably consume the entirety of the regenerative electric power, and to stop the upper swivel body 3 at a desired braking torque.

Further, in a case where the power storage system 120 is stopped, the controller 30 may limit the swivel torque or the like when the swiveling motor 21 is in the power running operation, to thereby limit the regenerative electric power generated by the swiveling motor 21 when the swiveling motor 21 is operated for regeneration thereafter. In this case, it is possible to prevent the regenerative electric power from exceeding the consumable power of the motor generator 12, and to stop the upper swivel body 3 at a desired braking torque so that the motor generator 12 can reliably consume the entirety of the regenerative electric power.

Further, in a case where the power storage system 120 is stopped, and in a case where a complex operation including a swivel operation and an operation of a hydraulic actuator is performed, the controller 30 may limit the operation of the hydraulic actuator according to limiting of the swivel torque or the like when the swiveling motor 21 is in the power running operation. In this case, it is possible to reduce an operation speed of the hydraulic actuator according to reduction of a maximum swivel speed, and to realize an operational feeling desired by an operator.

Further, in a case where the power storage system 120 is stopped, when the swiveling motor 21 is in the regenerative operation, the controller 30 may limit a braking torque in a case where the posture of the shovel is in an unstable state. In this case, it is possible to prevent the shovel from losing its balance due to reaction based on the inertia of the upper swivel body 3 generated when the upper swivel body 3 stops swiveling.

Hereinbefore, preferred embodiments of the invention have been described, but the invention is not limited to the above-described embodiments, and various modifications and replacements may be made without departing from the scope of the invention.

It should be understood that the invention is not limited to the above-described embodiment, but may be modified into various forms on the basis of the spirit of the invention. Additionally, the modifications are included in the scope of the invention.

What is claimed is:
1. A shovel comprising:
a hydraulic pump;
a motor generator that configured to drive the hydraulic pump;
a power storage system;
a swiveling motor performing a swiveling operation by electric power; and
a control device,
wherein when the power storage system is stopped, the control device supplies regenerative electric power generated during deceleration of the swiveling motor to the motor generator.
2. The shovel according to claim 1, further comprising:
a heat consumption unit that consumes the regenerative electric power of the swiveling motor as heat.
3. The shovel according to claim 1, wherein when the power storage system is stopped, the control device limits a swiveling torque to limit the regenerative electric power generated by the swiveling motor.
4. The shovel according to claim 3, wherein when the power storage system is stopped and a complex operation including a swivel operation and an operation of a hydraulic actuator is performed, the control device limits a movement of the hydraulic actuator according to the limited swiveling torque.
5. The shovel according to claim 1, further comprising:
a slope detection unit that detects that the shovel is disposed at a slope,
wherein the shovel is detected to be at the slope and the power storage system is stopped, the control device supplies the electric power of the motor generator to the swiveling motor, and supplies the regenerative electric power of the swiveling motor to the motor generator.

6. The shovel according to claim 1, wherein when the power storage system is stopped, the control device limits a braking torque according to a posture of the shovel.

7. The shovel according to claim 1, wherein, after the power storage system is stopped and a swivel body driven by the swiveling motor is stopped, the control device allows the swiveling motor to be driven using generated by the motor generator and allows the motor generator to be driven using the regenerative electric power generated by the swiveling motor.

8. The shovel according to claim 7, wherein, when the swiveling motor and the motor generator are allowed to be driven, the control device suppresses output of the swiveling motor and the motor generator such that a swiveling speed of the swiveling motor is reduced and a moving speed of the hydraulic actuator driven by the motor generator and the hydraulic pump is reduced.

* * * * *